D. F. Pond.
Eraser.
No. 9277.        Patented Sep. 21, 1852.
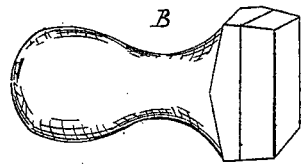

UNITED STATES PATENT OFFICE.

DANIEL F. POND, OF NEW HAVEN, CONNECTICUT.

CRAYON-RUBBER.

Specification of Letters Patent No. 9,277, dated September 21, 1852.

*To all whom it may concern:*

Be it known that I, DANIEL F. POND, of New Haven, in the county of New Haven and State of Connecticut, have invented a new and useful Article, called "Pond's Two-Crayon Rubbers;" and I do hereby declare that the following is a full and exact description thereof, reference being had to the accompanying drawings, and to the letters of reference thereon marked.

The nature of my invention consists in producing a substance to be used in rubbing in prepared chalk, and blending the crayons in the style of drawing of which I am the inventor, and which is denominated the "Two crayon, or improved monochromatic drawing." The great superiority of this style over common pencil drawing consists in the very great rapidity of execution and the utmost delicacy of shading attainable therein. But in order to the attainment of these advantages, it is necessary that something else be made use of in the application of colors than the mere crayons themselves. And as the colors are to be applied to paper, or other material, having an evenly granulated surface of prepared marble or other hard substance, it is necessary that the rubber used should possess the following properties. 1st. It should be sufficiently pliant and elastic, to press the prepared chalk and the crayons, between the particles composing the granulated surface. 2d. The rubbing surface should be perfectly smooth, so that the chalk and colors may be evenly applied, and the shading delicately graudated. 3d. The edges and corners next the rubbing surface of the rectangular rubbers should be perfectly smooth and slightly rounded. Smooth for the reason already given, and slightly rounded, because, in the 1st place, if perfectly sharp, it would very soon by use, have a rough and jagged edge, rendering the whole instrument unfit for use. In the 2d place, a sharp edge would to a greater or less extent, displace the crayon with which it came in contact. And in the 3d place, if the edge or corner were sharp, portions of it, (on the side toward which the rubber happened to be moving) coming in contact with the protuberant particles, would be constantly turning under, thus alternately elevating and depressing one side or the other of the rubber, and wholly destroying its utility. 4thly. It should not be liable to any changes by cold or heat.

Previous to the invention for which I now ask a patent, buckskin and cork were used in various ways for rubbing in colors, but these lack many of the essential requisites enumerated above. The native india rubber has been sometimes used, but it is almost if not quite impossible even by cutting and grinding, to produce a sufficiently smooth surface, and the requisite forms at the corners and edges, and the native gum is furthermore objectionable in that it very soon wears rough, particularly at the corners and edges, and in cold weather it becomes too rigid for use. Previous to my invention the ball of the thumb or finger was found to answer the purposes of a rubber better than any other known substance, but the impossibility of using the thumb or finger any length of time for this purpose, by reason of the tenderness and soreness thereby occasioned renders some substitute absolutely necessary.

To enable others skilled in the art to make and use my invention, I proceed to describe the mode in which it is produced.

In the first place I procure molds of different sizes and shapes, from 1/4 of an inch in diameter, or less, upward and either rectangular, oval, conical, or cylindrical, as may be required. It is exceedingly difficult to obtain molds by casting suitable for the purpose on account of the air cells that despite all care and ingenuity will sometimes form upon the interior surface. I therefore make use of dies, with which I stamp thin sheets of tin or other metallic substance into the required shape, and embedding these in solid wood or metal use them as molds. I then fill these molds with the india rubber compound of which Goodyear's patented articles are made, and of whom I have purchased a right for this purpose. And after the molds are thus filled they are subjected to a great pressure and to steam heat in the manner described in Goodyear's specification. These rubbers are then firmly attached to handles of metal or wood as are shown in the accompanying drawings, and are then ready for use.

I do not claim as new the casting of particular forms of vulcanized rubber in molds, but What I do claim as my invention and desire to secure by Letters Patent, is—

5 The crayon rubber made in the manner hereinbefore substantially set forth for the purpose of applying and blending the crayons in the bichromatic and other kindred styles of drawing.

D. F. POND.

Witnesses:
W. J. BURLING,
EDWD. OLIN BURLING.